(12) United States Patent
Headley (10) Patent No.: US 11,369,940 B2
(45) Date of Patent: Jun. 28, 2022

(54) STRUCTURED PACKING MODULE FOR USE IN A MASS TRANSFER COLUMN AND METHOD OF ASSEMBLY

(71) Applicant: KOCH-GLITSCH, LP, Wichita, KS (US)

(72) Inventor: Darran Headley, Wichita, KS (US)

(73) Assignee: KOCH-GLITSCH, LP, Wichita, KS (US)

( * ) Notice: Subject to any disclaimer, the term of this patent is extended or adjusted under 35 U.S.C. 154(b) by 261 days.

(21) Appl. No.: 16/225,807

(22) Filed: Dec. 19, 2018

(65) Prior Publication Data

US 2019/0210000 A1 Jul. 11, 2019

Related U.S. Application Data

(60) Provisional application No. 62/614,750, filed on Jan. 8, 2018.

(51) Int. Cl.
*B01J 19/32* (2006.01)
*B01D 3/00* (2006.01)

(52) U.S. Cl.
CPC ............. *B01J 19/32* (2013.01); *B01D 3/008* (2013.01); *B01J 19/325* (2013.01); *B01J 2219/3221* (2013.01); *B01J 2219/32213* (2013.01); *B01J 2219/32217* (2013.01); *B01J 2219/32244* (2013.01); *B01J 2219/32255* (2013.01);
(Continued)

(58) Field of Classification Search
CPC .................... B01D 3/008; B01J 19/325; B01J 2219/32213; B01J 2219/32217; B01J 19/32; B01J 2219/3221; B01J 2219/32244; B01J 2219/32255; B01J 2219/32272; B01J 2219/32275
See application file for complete search history.

(56) References Cited

U.S. PATENT DOCUMENTS 5,975,503 A * 11/1999 Chuang ............... B01F 25/4322
261/112.1
6,089,549 A * 7/2000 Ingram ................. B01D 53/18
366/337
(Continued)

FOREIGN PATENT DOCUMENTS

CN 1133823 A 10/1996
CN 1260021 A 7/2000
(Continued)

OTHER PUBLICATIONS

First Office Action and Search Report received for CN application No. 201880085063.8, dated Aug. 31, 2021, 22 pages. (10 pages of English translation and 12 pages of Official copy).
(Continued)

*Primary Examiner* — Stephen Hobson (57) ABSTRACT

A structured packing module for use in a mass transfer column. Corrugated sheets of structured packing in the structured packing module are held together by fasteners that extend into the corrugated sheets from opposite sides of the structured packing module at an angle of inclination or perpendicularly with respect to the sides of the structured packing module. The fasteners may have an outer surface with protrusions or indentations that resist removal of the fasteners from the structured packing sheets.

26 Claims, 10 Drawing Sheets

(52) U.S. Cl.
CPC ............... *B01J 2219/32272* (2013.01); *B01J 2219/32275* (2013.01)

(56) References Cited

U.S. PATENT DOCUMENTS

| | | | | |
|---|---|---|---|---|
| 6,119,481 | A * | 9/2000 | Sunder | F25J 3/04909 |
| | | | | 62/643 |
| 6,478,290 | B1 * | 11/2002 | Ender | B01J 19/32 |
| | | | | 261/112.2 |
| 7,761,994 | B2 * | 7/2010 | Repasky | B01J 19/325 |
| | | | | 29/890 |
| 9,758,406 | B2 * | 9/2017 | Kulick, III | C02F 3/101 |
| 2003/0116871 | A1 | 6/2003 | Ringo | |
| 2007/0297956 | A1 * | 12/2007 | Repasky | B01J 19/249 |
| | | | | 29/890 |
| 2010/0065501 | A1 * | 3/2010 | Nieuwoudt | B01J 19/325 |
| | | | | 210/455 |
| 2015/0136582 | A1 * | 5/2015 | Takeyama | B01D 53/18 |
| | | | | 261/109 |
| 2015/0258467 | A1 * | 9/2015 | Kim | B23P 11/00 |
| | | | | 29/525.02 |
| 2015/0336080 | A1 | 11/2015 | Krell | |
| 2017/0050168 | A1 * | 2/2017 | Kehrer | B01J 19/32 |
| 2017/0072380 | A1 * | 3/2017 | Roesler | B01J 20/3092 |

FOREIGN PATENT DOCUMENTS

| | | |
|---|---|---|
| CN | 201701938 U | 1/2011 |
| CN | 102326005 A | 1/2012 |
| CN | 204865858 U | 12/2015 |
| CN | 107074167 A | 8/2017 |
| GB | 791967 A | 3/1958 |

OTHER PUBLICATIONS

International Search Report & Written Opinion for Corresponding PCT App. PCT/IB2018/060387.

* cited by examiner

STRUCTURED PACKING MODULE FOR USE IN A MASS TRANSFER COLUMN AND METHOD OF ASSEMBLY

BACKGROUND OF THE INVENTION

The present invention relates generally to columns in which mass transfer and heat exchange occur and, more particularly, to structured packing modules that are used in such columns and a method for assembling the structured packing modules.

Mass transfer columns are configured to contact at least two fluid streams to provide product streams of specific composition and/or temperature. The term "mass transfer column," as used herein is intended to encompass columns in which mass and/or heat transfer is the primary objective. Some mass transfer columns, such as those utilized in multicomponent distillation and absorption applications, contact a gas-phase stream with a liquid-phase stream, while others, such as extraction columns, may be designed to facilitate contact between two liquid phases of different densities. Oftentimes, mass transfer columns are configured to contact an ascending vapor or liquid stream with a descending liquid stream, usually along multiple mass transfer surfaces disposed within the column. Commonly, these transfer surfaces are defined by structures placed in the interior volume of the column that are configured to facilitate intimate contact between the two fluid phases. Because of these transfer surfaces, the rate and/or degree of mass and heat transferred between the two phases is enhanced.

Structured packing is commonly used to provide heat and/or mass transfer surfaces within a column. Many different types of structured packing exist, and most include a plurality of corrugated structured packing sheets that are positioned in an upright, parallel relationship and are joined together to form a structured packing brick or module with fluid passages formed along the crossing corrugations of adjacent sheets. Individual ones of the structured packing modules are positioned end-to-end and side-by-side to form a structured packing layer that fills the horizontal cross section of the column. Multiple packing layers are normally placed in contact with each other and with the orientation of the structured packing sheets in one layer rotated with respect to the structured packing sheets in adjacent layers.

Various methods are conventionally used to join together the collection of individual structured packing sheets that form the structured packing module. One method involves driving nails through all of the structured packing sheets so that a head of each nail bears against the first structured packing sheet and an end portion of each nail extends beyond the last structured packing sheet. The end portion of each nail is then bent over against the last packing sheet to prevent removal of the nail and to hold the assembled structured packing sheets tightly together. The process of bending the end portion of each nail adds an extra step in the assembly process and may exert localized forces on the structured packing sheets that cause them to deform and disrupt the intended interaction of the vapor and liquid flowing through the structured packing module. Another method of joining the structured packing sheets together uses screws, which tend to be more expensive than nails and, when overtightened, may cause deformation of the structured packing sheets. Electric resistance welding has also been used to join the structured packing sheets together, but this process requires specialized equipment and is more time consuming than simply driving nails or turning screws.

A need has thus developed for an improved method of joining together structured packing sheets to form a structured packing module.

SUMMARY OF THE INVENTION

In one aspect, the present invention is directed to a structured packing module comprising a plurality of individual structured packing sheets that are arranged sequentially in an upright, parallel relationship to each other, wherein a front face of a first one of the structured packing sheets forms one side of the structured packing module and a rear face of a last one of the structured packing sheets forms the opposite side of the structured packing module, and fasteners that extend into the structured packing sheets from the opposite sides of the structured packing module. The fasteners may extend at an angle of inclination with respect to the sides of the structured packing module or they may extend perpendicularly to the sides of the structured packing module.

In another aspect, the present invention is directed to a structured packing layer comprising a plurality of the structured packing modules described above that are positioned in end-to-end and side-to-side relationship.

In a further aspect, the present invention is directed to a method of forming the structured packing module comprising assembling the structured packing sheets together in a sequential arrangement in an upright, parallel relationship to each other, wherein a front face of a first one of the structured packing sheets forms one side of the structured packing module and a rear face of a last one of the structured packing sheets forms the opposite side of the structured packing module, and inserting fasteners into the structured packing sheets from the opposite sides of the structured packing module. The fasteners may be inserted at an angle of inclination with respect to the sides of the structured packing module or they may be inserted perpendicularly to the sides of the structured packing module.

In a still further aspect, the present invention is directed to a structured packing module comprising a plurality of individual structured packing sheets that are arranged sequentially in an upright, parallel relationship to each other, wherein a front face of a first one of the structured packing sheets forms one side of the structured packing module and a rear face of a last one of the structured packing sheets forms the opposite side of the structured packing module, and fasteners that extend into the structured packing sheets from the opposite sides of the structured packing module and have an outer surface with protrusions or indentations that resist removal of the fasteners from the structured packing sheets.

BRIEF DESCRIPTION OF THE DRAWINGS

In the accompany drawings that form part of the specification and in which like reference numerals are used to indicate like components in the various views.

DETAILED DESCRIPTION

Figure 1:
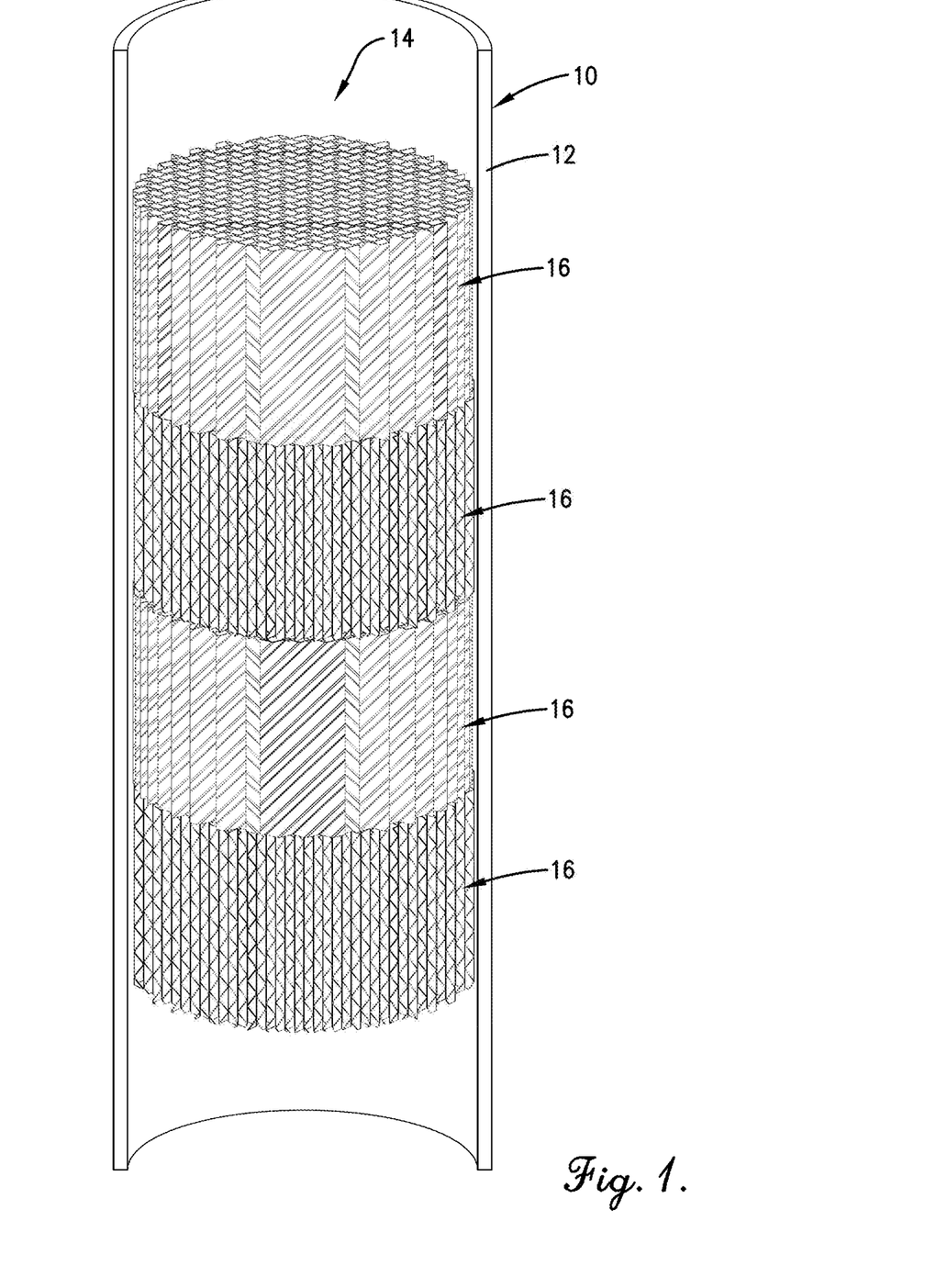
FIG. 1 is a fragmentary, perspective view of a mass transfer column in which a portion of a shell of the column is broken away to show layers of structured packing in the open internal regions within the shell.

Turning now to the drawings in greater detail and initially to FIG. 1, a mass transfer column suitable for use in mass transfer or heat exchange processes is represented generally by the numeral 10. The mass transfer column 10 includes an upright, external shell 12 that may be cylindrical in configuration, although other configurations, including polygonal, are possible and are within the scope of the present invention. The shell 12 may be of any suitable diameter and height and may be constructed from one or more rigid materials that are desirably inert to, or are otherwise compatible with, the fluids and conditions present during operation of the mass transfer column 10.

The mass transfer column 10 may be of a type used for processing fluid streams, typically liquid or vapor streams, to obtain fractionation products or to otherwise cause mass transfer or heat exchange between the fluid streams. For example, the mass transfer column 10 may be one in which crude atmospheric, lube vacuum, crude vacuum, fluid or thermal cracking fractionating, coker or visbreaker fractionating, coke scrubbing, reactor off-gas scrubbing, gas quenching, edible oil deodorization, pollution control scrubbing, or other processes occur.

The shell 12 of the mass transfer column 10 defines an open internal region 14 in which the desired mass transfer or heat exchange between the fluid streams occurs. In one implementation, the fluid streams may comprise one or more ascending vapor streams and one or more descending liquid streams. In other implementations, the fluid streams may comprise substantially any combination of ascending or descending liquid streams or ascending or descending vapor streams.

One or more fluid streams may be directed into the mass transfer column 10 through any number of feed lines (not shown) positioned at appropriate locations along the height of the mass transfer column 10. In one implementation, vapor streams may be generated within the mass transfer column 10 rather than being introduced into the mass transfer column 10 through the feed lines. One or more fluid streams may be directed out of the mass transfer column 10 through any number of takeoff lines. In one implementation, liquid may be introduced through an upper feed line, descend through the mass transfer column 10, and be removed through a takeoff line, while vapor may be introduced through a lower feed line, ascend through the mass transfer column 10, and be removed through an upper takeoff line.

Other mass transfer column components that would typically be present, such as reflux stream lines, reboilers, condensers, vapor horns, liquid distributors, and the like, are not illustrated in the figures because they are conventional in nature and an illustration of these components is not believed to be necessary for an understanding of the present invention.

One or more structured packing layers 16 are positioned within the open internal region 14 of the column 10. In the illustrated embodiment, four packing layers 16 are provided in a stacked relationship, but it is to be understood that more of fewer packing layers 16 may be provided. Each of the structured packing layers 16 extends completely across the horizontal, internal cross section of the column 10 and is suitably supported, such as on a support ring (not shown) fixed to the column shell 12, on an underlying packing layer 17, or by a grid or other suitable support structure (not shown).

Figure 2:
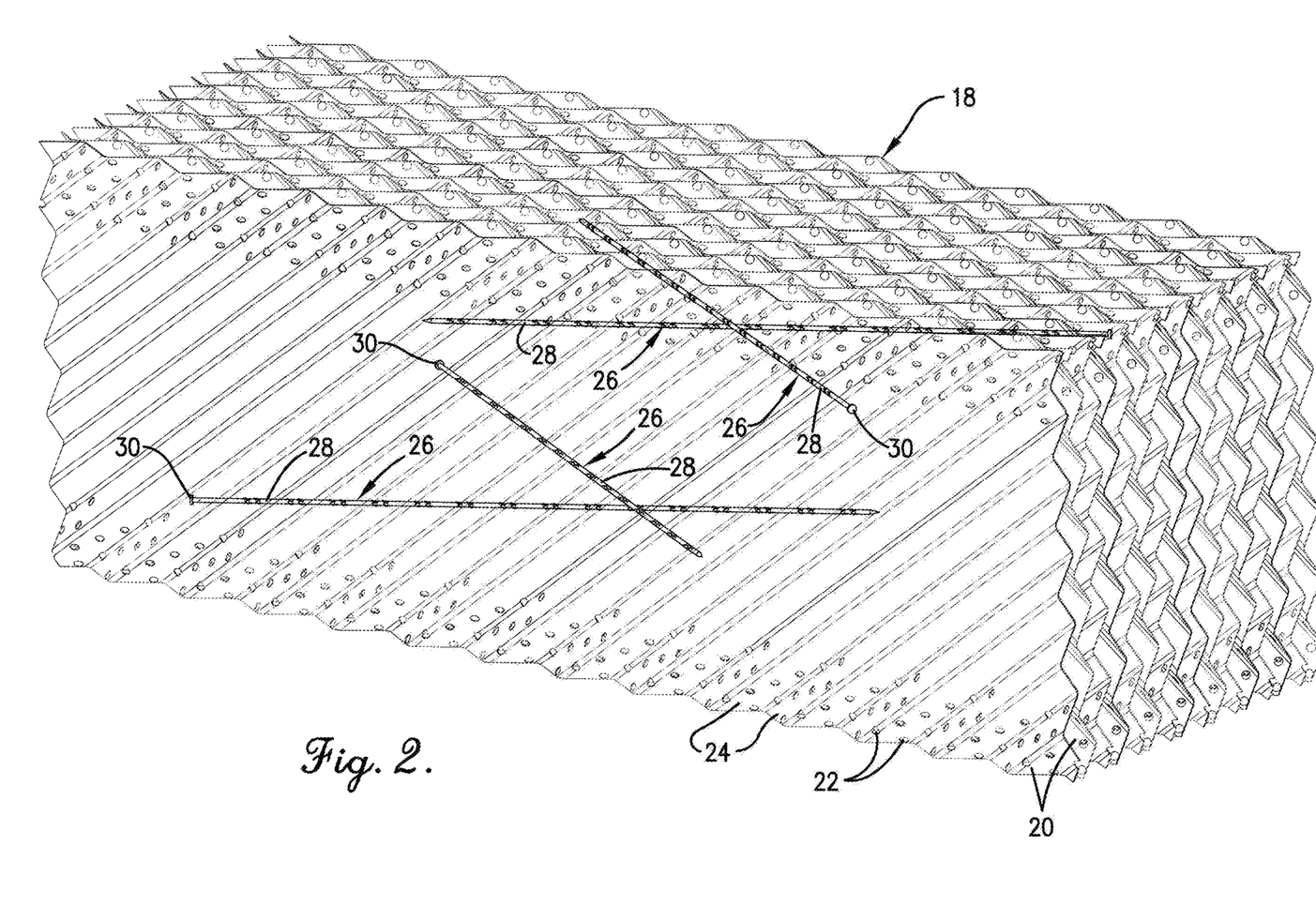
FIG. 2 is a side perspective view of a structured packing brick that is held together by fasteners that are inserted through opposite sides of the packing brick.
Figure 3:
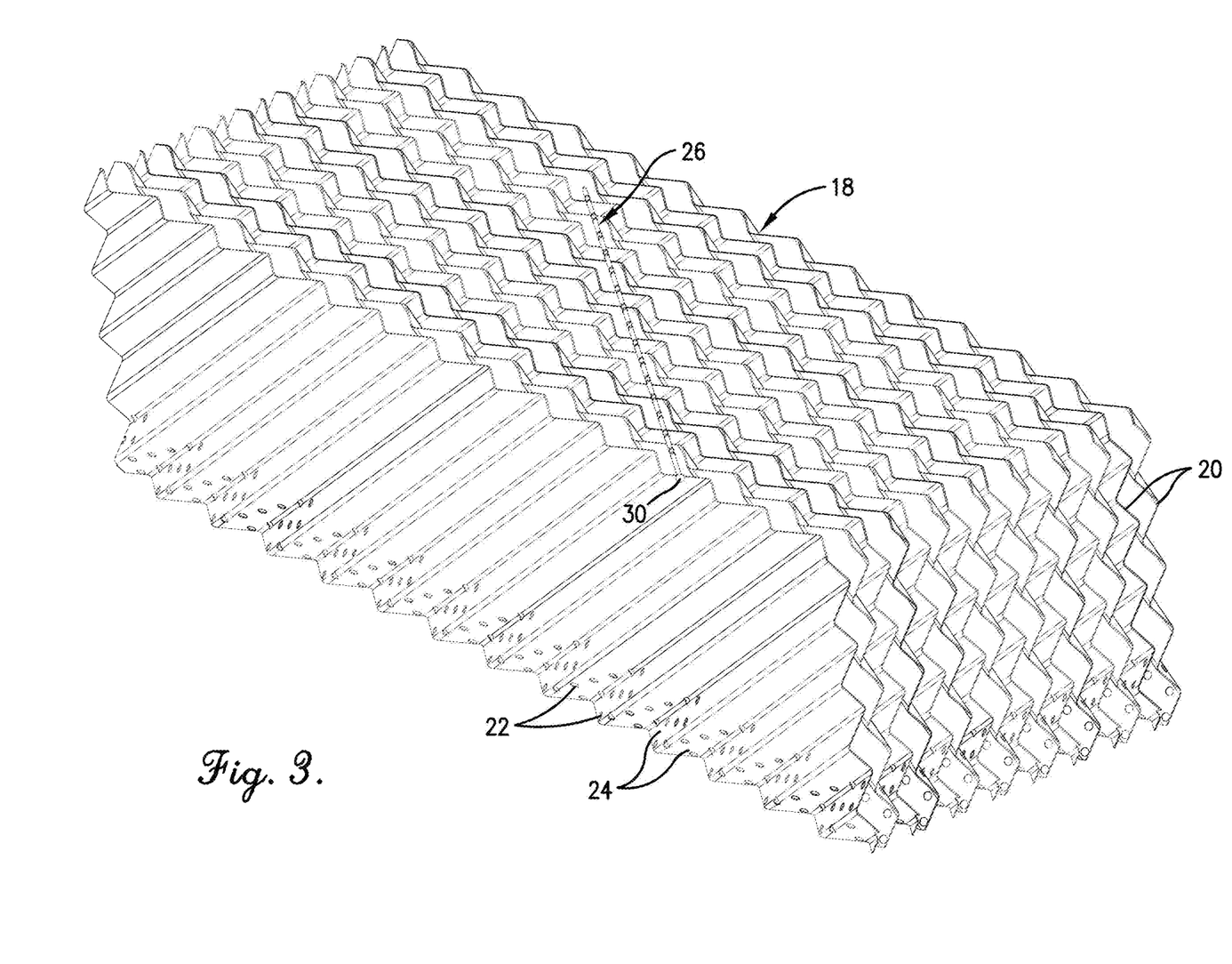
FIG. 3 is side perspective view of a portion of the structured packing brick that has been cut in a horizontal plane along one of the fasteners.
Figure 4:
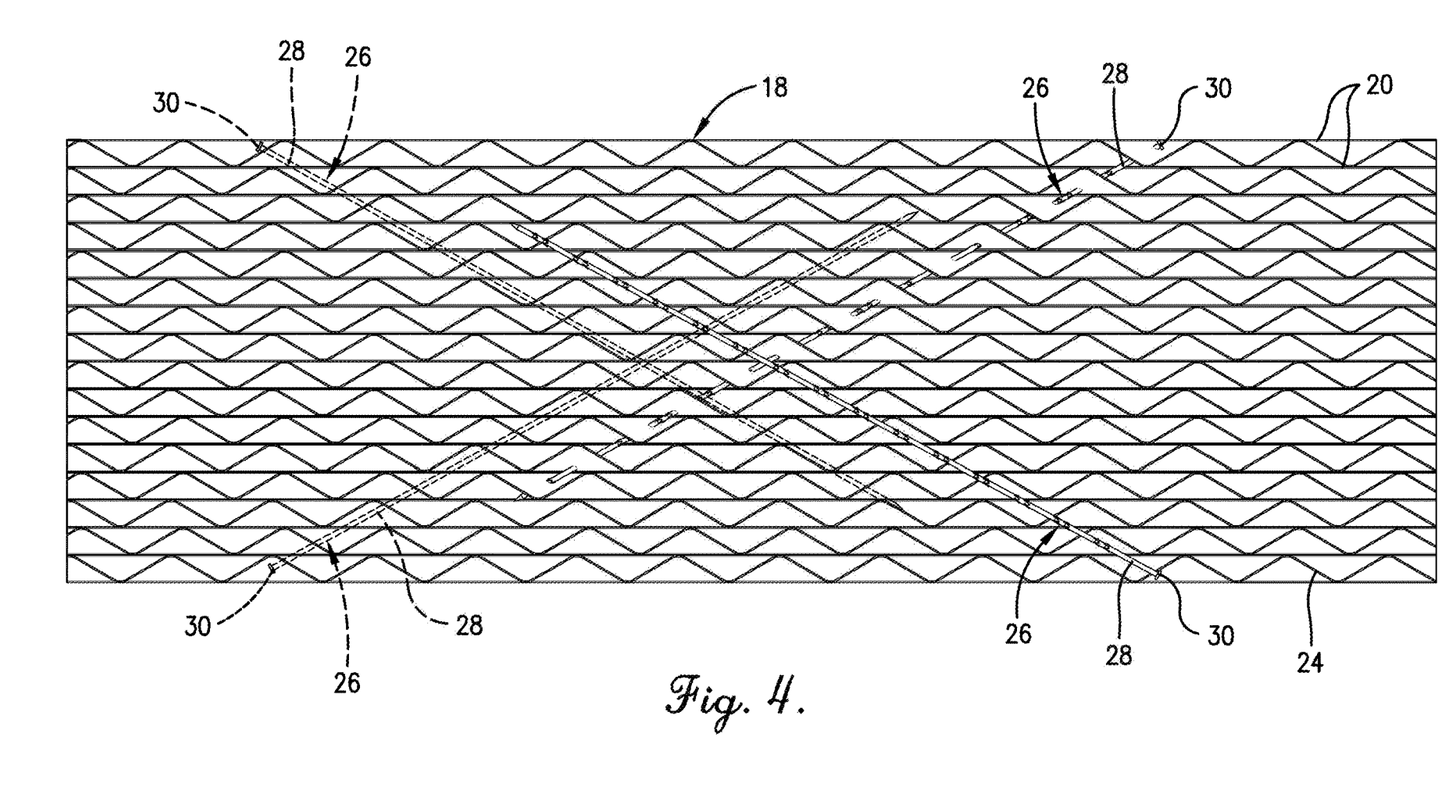
FIG. 4 is a top plan view of the structured packing brick.

Turning additionally to FIGS. 2-4, each packing layer 16 is formed by a plurality of structured packing modules 18 that are, in turn, formed from a plurality of individual structured packing sheets 20. The structured packing sheets 20 in each structured packing module 18 are positioned in an upright, parallel relationship to each other. Each of the structured packing sheets 20 is constructed from a suitably rigid material, such as any of various metals, plastics, or ceramics, having sufficient strength and thickness to withstand the processing conditions experienced within the column 10. Each of the structured packing sheets 20 presents a front face and a back face, of which all, or a portion, may be generally smooth and free of surface texturing, or which may include various types of texturing, embossing, grooves, or dimples. In the illustrated embodiment, the structured packing sheets 20 are shown perforated with optional apertures 22 that allow fluid to pass through the individual structured packing sheets 20. In the drawings, the apertures 22 are shown only in some portions of the structured packing sheets 20 for illustration purposes, but it is to be understood that the apertures 22 may normally be placed in all regions of the structured packing sheets 20. The configuration of the surfaces of packing layers 18 and the optional use of the apertures 22 depends on the particular application in which the packing elements 16 are used and may be selected to maximize contact between the ascending and descending fluid streams.

Each structured packing sheet 20 is also shown as being corrugated with a plurality of parallel corrugations 24 that extend along a portion, or all, of the associated packing layer 18. The corrugations 24 are generally of a triangular or sinusoidal cross section and are formed of alternating peaks and valleys and corrugation sidewalls that extend between adjacent peaks and valleys. A valley formed on a front face of the corrugated packing sheet 20 appears as a peak on the opposite or rear face. Adjacent ones of the structured packing sheets 20 are arranged with the corrugations 24 in a crisscrossing or cross-corrugated fashion so that the corrugations 24 of each structured packing sheet 20 extend at an oblique angle to the corrugations 24 of each adjacent structured packing sheet 20. The angle of inclination of each of the corrugations in relation to the vertical axis of the column 10 can be selected for the requirements of particular application for which the structured packing module 18 is intended to be used. Inclination angles of at least 30°, at least 45°, and at least 60°, may be used, as well as other angles suitable to a particular end use for column 10. Adjacent ones of the structured packing sheets 20 are shown with their corrugations 24 in contact with each other. In other embodiments, some or all of the corrugations 24 in one of the structured packing sheet 20 are spaced from the corrugations 24 in the adjacent structured packing sheets 20, such as by the use of spacers.

Each structured packing layer 16 formed by the structured packing modules 18 may normally be stacked directly on the adjacent underlying structured packing layer 16 and may typically be rotated relative to the adjacent packing layer(s) 16 so that the individual structured packing sheets 20 in one of the packing layers 16 are positioned in vertical planes that are rotated to form an angle with respect to the vertical planes defined by the individual packing sheets 20 in the adjacent structured packing layer(s) 16. This angle of rotation is typically 45 or 90 degrees, but can be other angles if desired. The overall height of each packing layer 16 can range from about 2 to about 12 inches in one embodiment, but may be varied from that range, depending on the particular application in which the structured packing module 18 is intended to be used.

The structured packing modules 18 are shown in FIGS. 2-4 as having a six-sided polyhedron shape, i.e., a hexahedron, in the form of a rectangular cuboid. In other embodiments, the structured packing modules 18 may be in other shapes, including cubes and parallelepipeds. Those structured packing modules 18 positioned at an outer perimeter of each structured packing layer 16 may have a curved side so that the outer perimeter of the structured packing layer 16 forms a circle that conforms to the cylindrical shape of the shell 12 of the mass transfer column 10. From one perspective, the structured packing sheets 20 are arranged sequentially with the front face of a first one of the structured packing sheets 20 forming one side of the structured packing module 18 and the rear face of a last one of the assembled structured packing sheets 20 forming the opposite side of the structured packing module 18. The ends of the structured packing sheets 20 form the ends of structured packing module 18 and the top and bottom edges of the structured packing sheets 20 form the top and bottom surfaces of the structured packing module 18.

The individual structured packing sheets 20 that are assembled in each of the structured packing modules 18 are held together by fasteners 26 that extend into the structured packing sheets 20 from the opposite sides of the structured packing module 18. In accordance with an embodiment of the present invention, the fasteners 26 extend at an angle of inclination with respect to the sides of the structured packing module 18. The angle of inclination may in one embodiment be in the range of between 30 and 80 degrees. In another embodiment, the angle of inclination may be in the range of between 40 and 70 degrees. Other angles of inclination are possible.

In one embodiment, the fasteners 26 that extend from one side of the structured packing module 18 do not extend to or penetrate the other side of the structured packing module 18. Likewise, the fasteners 26 that extend from the other side of the structured packing module 18 do not extend through the one side of the structured packing module 18. The fasteners 26 may each extend through at least 60 percent, at least 75 percent, or at least 95 percent of the number of structured packing sheets 20 in each structured packing module 18. In other embodiments, the fasteners 26 may extend through the opposite side of the structured packing module 18, but should not extend through the opposite side to an extent that would interfere with the side-by-side placement of the structured packing modules 18.

Figure 5:
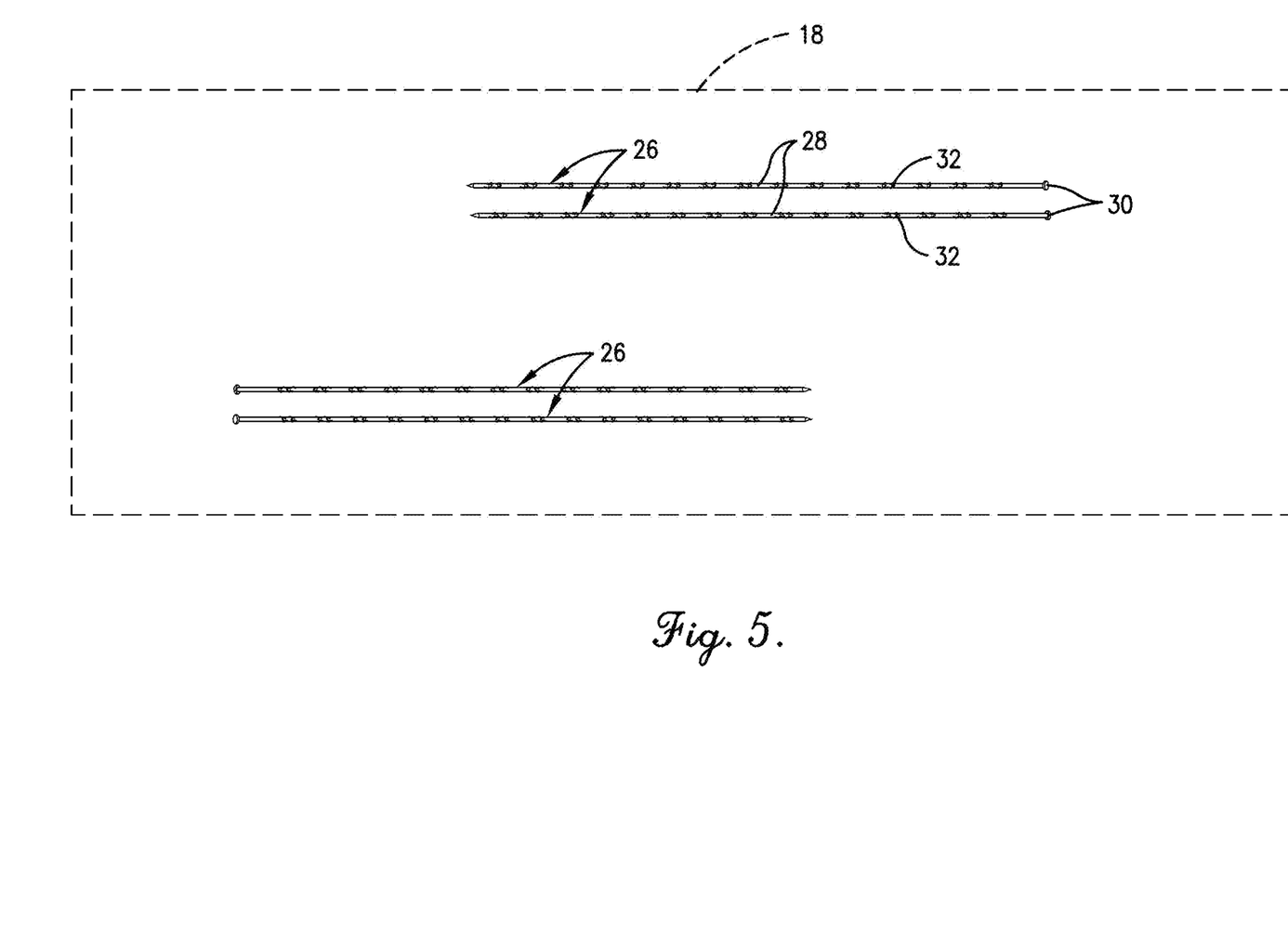
FIG. 5 is a side elevation view showing the fasteners and an outline of the structured packing brick.
Figure 6:
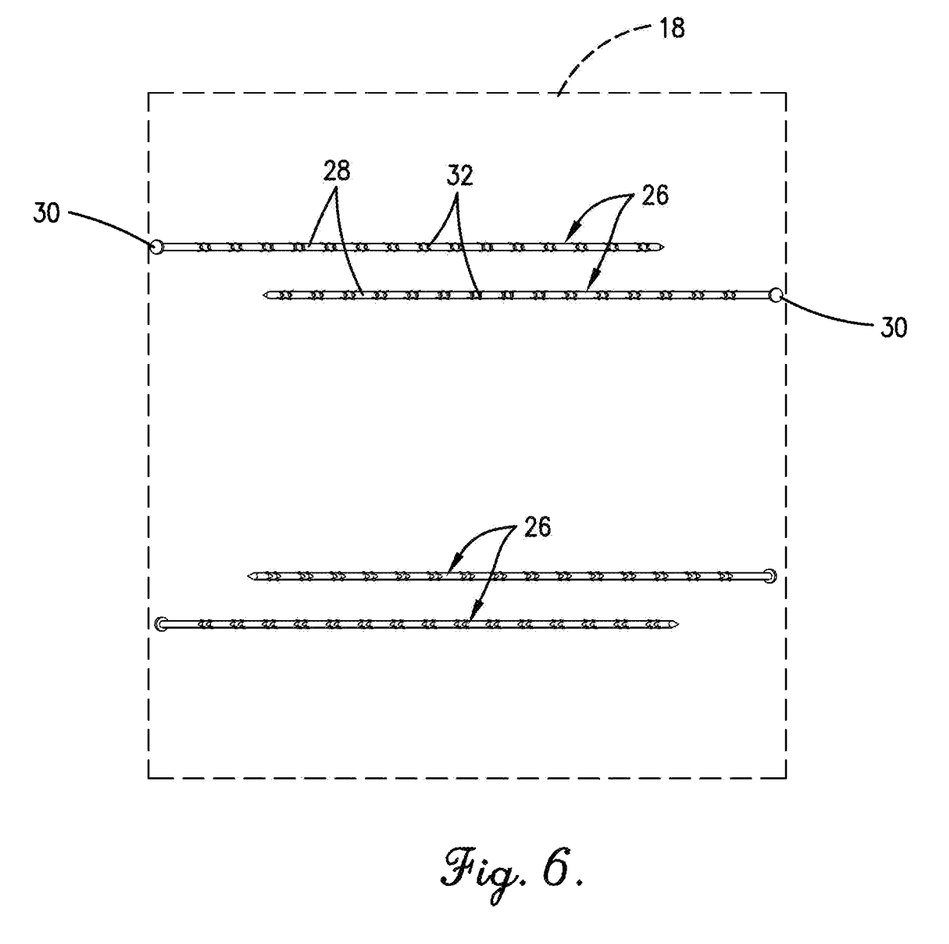
FIG. 6 is an end elevation view showing the fasteners and an outline of the structured packing brick.
Figure 7:
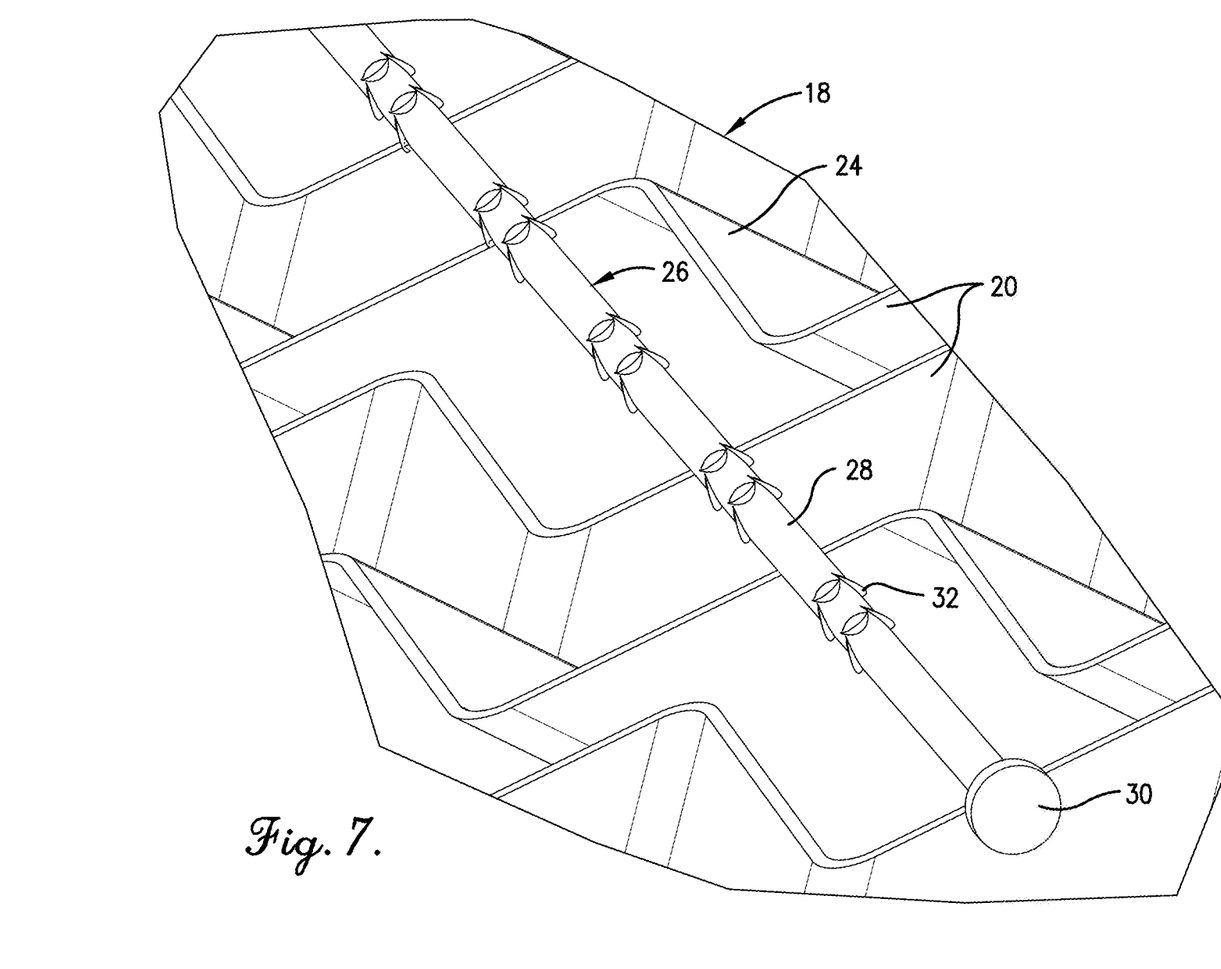
FIG. 7 is a top fragmental perspective view of the structured packing brick and one of the fasteners and shown on an enlarged scale from that used in FIGS. 2-6.

As can best be seen in FIGS. 2, 5 and 6, each of the fasteners 26 that extends from one of the sides of the structured packing module 18 is paired with another one of the fasteners 26 that extends from the opposite side of the structured packing module 18, with the crossing angle between the fasteners 26 resisting separation of the structured packing sheets 20 within the structured packing module 18. Normally, at least two of the pairs of fasteners 26 are positioned at spaced-apart locations in the structured packing module 18.

Figures 9, 10:
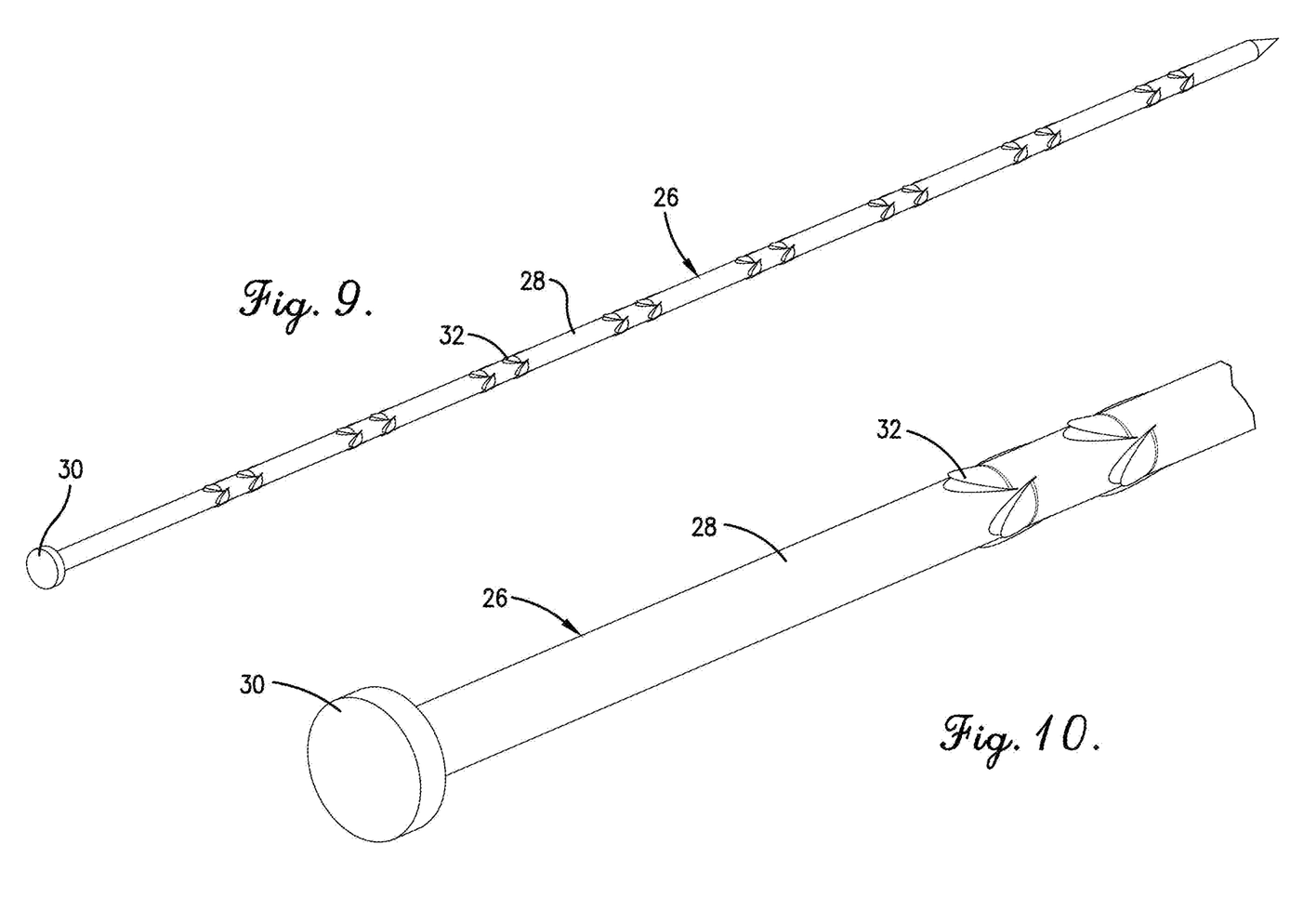
FIG. 9 is a top perspective view of one of the fasteners.
FIG. 10 is a top fragmental perspective view of the fastener on an enlarged scale from that used in FIG. 9.
Figure 11:
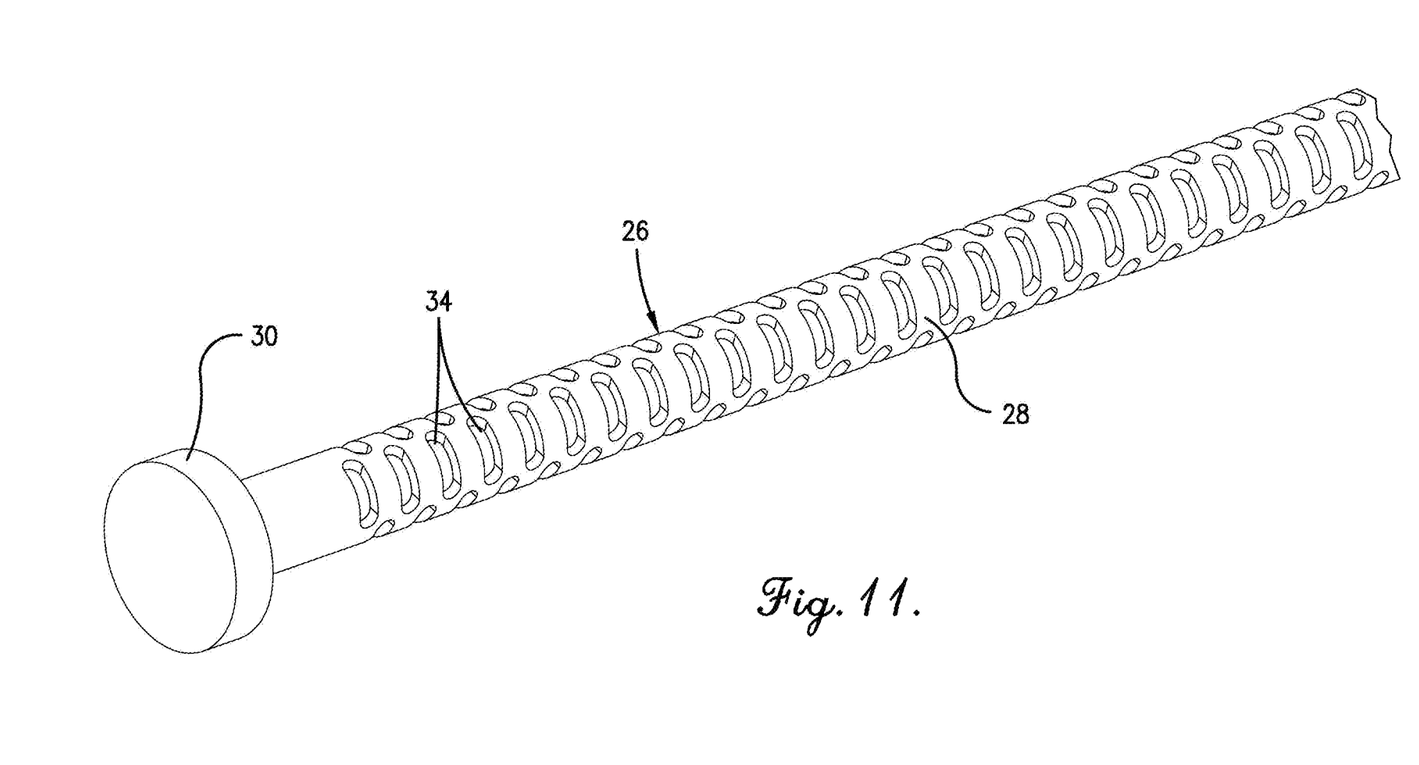
FIG. 11 is a top fragmental perspective view of another embodiment of a fastener.

The fasteners 26 may comprise various forms. In the illustrated embodiment shown in FIGS. 9-11, each fastener 26 comprises a shank 28 having a head 30 at one end and a pointed opposite end. The head 30 may be flattened to provide a broader surface to bear against the structured packing sheet 20 that it contacts. The shank 28 may have an outer surface that is smooth or it may include protrusions or raised structures 32 that resist removal of the fastener 26 from the structured packing sheets 20. The raised structures 32 may be of various forms, including the reverse-facing teeth illustrated in FIGS. 9 and 10, ring-like structures or helical structures. In another embodiment, the outer surface of the shank 28 may include grooves 34 as shown in FIG. 11 or other indentations that serve to resist removal of the fasteners 26 from the structured packing sheets 20.

Figure 8:
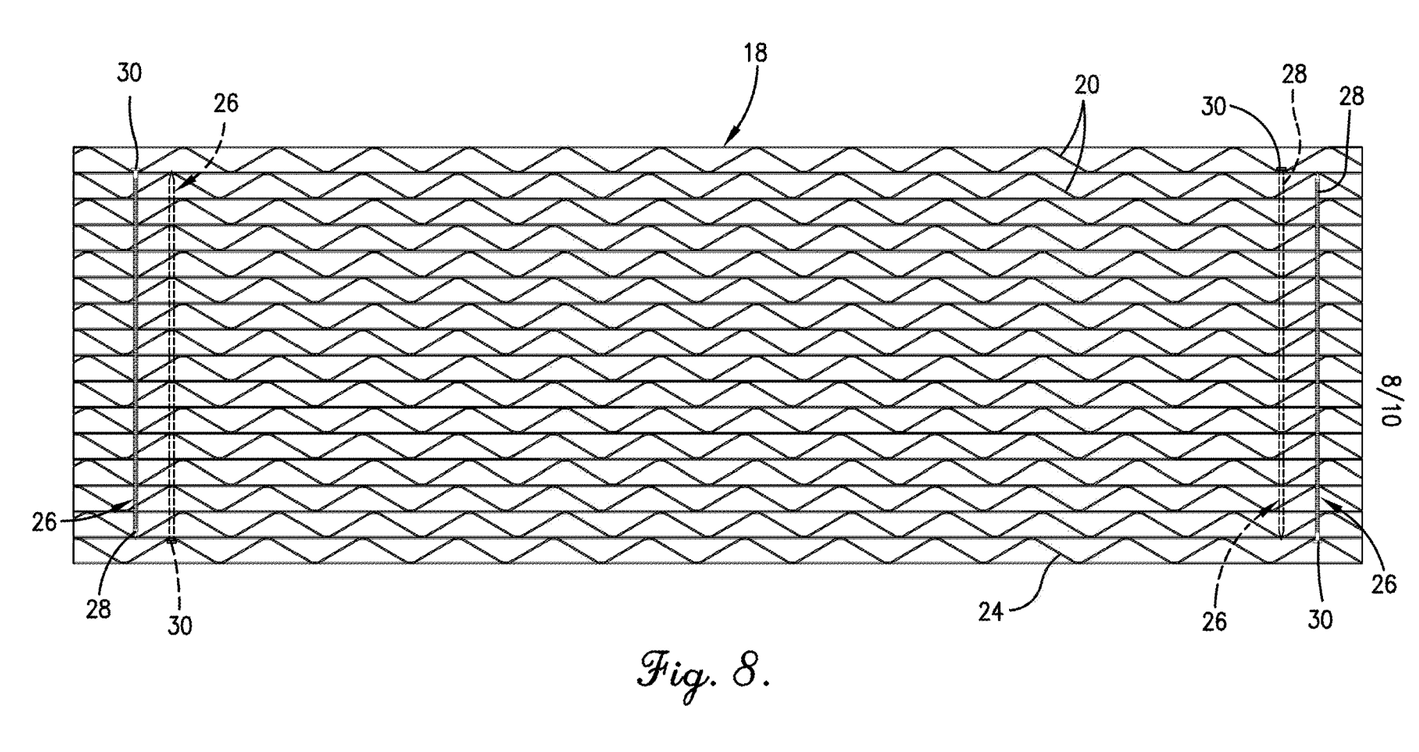
FIG. 8 is a top plan view of another embodiment of a structured packing brick.

When the shanks 28 of the fasteners 26 include the raised structures 32 and/or grooves 34, the fasteners 26 may extend perpendicularly with respect to the opposite sides of the structured packing module 18 as shown in FIG. 8, with the raised structures 32 and/or grooves 34 resisting separation of the structured packing sheets 20 within the structured packing module 18. In another embodiment as shown in FIGS. 2-7, the fasteners 26 having the raised structures 32 and/or grooves 34 extend at an angle of inclination from the opposite sides of the structured packing module 18, in which case both the crossing angle between the pairs of fasteners 26 and the raised structures 32 and/or grooves 34 resist separation of the structured packing sheets 20 in the structured packing module 18. In a still further embodiment, the fasteners 26 without the raised structures 32 and/or grooves 34 extend at an angle of inclination from the opposite sides of the structured packing module 18, and the crossing angle between the pairs of fasteners 26 resists separation of the structured packing sheets 20 in the structured packing module 18.

In a method of forming the structured packing module 18, the individual structured packing sheets 20 are assembled together in a sequential arrangement in an upright, parallel relationship to each other, with a front face of a first one of the structured packing sheets 20 forming one side of the structured packing module 18 and a rear face of a last one of the structured packing sheets 20 forming the opposite side of the structured packing module 18. The fasteners 26 are then inserted into the assembled structured packing sheets 20 from the opposite sides of the structured packing module 18 at an angle of inclination or perpendicularly with respect to the sides of the structured packing module 18. The fasteners 26 are inserted in one embodiment by exerting a driving force against the head 30 of the fastener 26. The driving force is calibrated to cause the fastener 26 to penetrate through the structured packing sheets 20 to bring the head 30 of the fastener 26 into engagement with the front face of the first one of the structured packing sheets 20 without causing deformation thereof.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A structured packing module comprising:
a plurality of individual structured packing sheets that are arranged sequentially in an upright, parallel relationship to each other, wherein a front face of a first one of the structured packing sheets forms one side of the structured packing module and a rear face of a last one of the structured packing sheets forms a second side of the structured packing module that is opposite from said first side; and
fasteners that extend into the structured packing sheets from the first and second sides of the structured packing module at an angle of inclination with respect to the first and second sides of the structured packing module.

2. The structured packing module of claim 1, wherein each of the structured packing sheets is corrugated with parallel corrugations and the structured packing sheets are arranged so that the corrugations of each one of the structured packing modules extend at an oblique angle to the corrugations of adjacent ones of the structured packing modules.

3. The structured packing module of claim 2, wherein the fasteners that extend into the structured packing sheets from the first side of the structured packing module do not extend to the second side of the structured packing module and the fasteners that extend into the structured packing sheets from the second side of the structured packing module do not extend to the first side of the structured packing module.

4. The structured packing module of claim 2, wherein at least one of the fasteners extending into the structured packing module from the first side of the structured packing module is paired with another one of the fasteners that extends into the structured packing module from the second side of the structured packing module.

5. The structured packing module of claim 4, wherein multiple ones of the fasteners extend into the structured packing module from spaced apart locations at the first side of the structured packing module and multiple ones of the fasteners extend into the structured packing module from spaced apart locations at the second side of the structured packing module.

6. The structured packing module of claim 2, wherein each of the fasteners comprises a shank extending from a head.

7. The structured packing module of claim 6, wherein said shanks have an outer surface with protrusions or indentations that resist removal of the fasteners from the structured packing sheets.

8. The structured packing module of claim 7, wherein the structured packing sheets are arranged so that the structured packing module forms a six-sided polyhedron shape.

9. The structured packing module of claim 8, wherein the six-sided polyhedron shape is a cube, a rectangular cuboid or a parallelepiped.

10. The structured packing module of claim 8, wherein the angle of inclination is between 30 and 80 degrees.

11. A structured packing layer comprising a plurality of structured packing modules positioned in end-to-end and side-to-side relationship, each of the structured packing modules comprising:
a plurality of individual structured packing sheets that are arranged sequentially in an upright, parallel relationship to each other, wherein a front face of a first one of the structured packing sheets forms one side of the structured packing module and a rear face of a last one of the structured packing sheets forms a second side of the structured packing module that is opposite from said first side,
wherein each of the structured packing sheets is corrugated with parallel corrugations and the structured packing sheets are arranged so that the corrugations of each one of the structured packing modules extend at an oblique angle to the corrugations of adjacent ones of the structured packing modules; and
fasteners that extend into the structured packing sheets from the first and second sides of the structured packing module at an angle of inclination with respect to the first and second sides of the structured packing module.

12. The structured packing layer of claim 11, wherein the fasteners that extend into the structured packing module from the first side of the structured packing module do not extend to the second side of the structured packing module and the fasteners that extend into the structured packing module from the second side of the structured packing module do not extend to the first side of the structured packing module.

13. The structured packing layer of claim 12, wherein at least one of the fasteners extending into the structured packing module from the first side of the structured packing module is paired with another one of the fasteners that extends into the structured packing module from the second side of the structured packing module.

14. The structured packing layer of claim 13, wherein multiple ones of the fasteners extend into the structured packing module from spaced apart locations at the first side of the structured packing module and multiple ones of the fasteners extend into the structured packing module from spaced apart locations at the second side of the structured packing module.

15. The structured packing layer of claim 14, wherein each of the fasteners comprises a shank extending from a head.

16. The structured packing layer of claim 15, wherein said shanks have an outer surface with protrusions or indentations that resist removal of the fasteners from the structured packing sheets.

17. The structured packing layer of claim 16, wherein the structured packing sheets are arranged so that at least some of the structured packing modules each forms a six-sided polyhedron shape.

18. The structured packing layer of claim 17, wherein the six-sided polyhedron shape is a cube, a rectangular cuboid or a parallelepiped.

19. The structured packing layer of claim 17, wherein the angle of inclination is between 30 and 80 degrees.

20. A method of forming the structured packing module of claim 1, comprising:
assembling the structured packing sheets together in a sequential arrangement in an upright, parallel relationship to each other, wherein a front face of a first one of the structured packing sheets forms one side of the structured packing module and a rear face of a last one of the structured packing sheets forms a second side of the structured packing module that is opposite from said first side; and
inserting fasteners into the structured packing sheets from the first and second sides of the structured packing module at an angle of inclination with respect to the first and second sides of the structured packing module.

21. A structured packing module comprising:
a plurality of individual structured packing sheets that are arranged sequentially in an upright, parallel relationship to each other, wherein a front face of a first one of the structured packing sheets forms one side of the structured packing module and a rear face of a last one of the structured packing sheets forms a second side of the structured packing module that is opposite from said first side,
wherein each of the structured packing sheets is corrugated with parallel corrugations and the structured packing sheets are arranged so that the corrugations of each one of the structured packing modules extend at an oblique angle to the corrugations of adjacent ones of the structured packing modules,
wherein the structured packing sheets are arranged so that the structured packing module is in the form of a cube, a rectangular cuboid or a parallelepiped; and
fasteners that extend into the structured packing sheets from the first and second sides of the structured packing module at an angle of inclination of between 30 and 80 degrees with respect to the first and second sides of the structured packing module.

22. The structured packing module of claim 21, wherein the fasteners that extend into the structured packing module from the first side of the structured packing module do not extend to the second side of the structured packing module and the fasteners that extend into the structured packing module from the second side of the structured packing module do not extend to the first side of the structured packing module.

23. The structured packing module of claim 21, wherein at least one of the fasteners extending into the structured packing module from the first side of the structured packing module is paired with another one of the fasteners that extends into the structured packing module from the second side of the structured packing module.

24. The structured packing module of claim 23, wherein multiple ones of the fasteners extend into the structured packing module from spaced apart locations at the first side of the structured packing module and multiple ones of the fasteners extend into the structured packing module from spaced apart locations at the second side of the structured packing module.

25. The structured packing module of claim 21, wherein each of the fasteners comprises a shank extending from a head.

26. The structured packing module of claim 25, wherein each of said shanks has an outer surface with protrusions or indentations that resist removal of the fastener from the structured packing sheets.

* * * * *